S. E. HADDORFF.
NON-SKID ATTACHMENT.
APPLICATION FILED MAY 13, 1918.
1,321,032.
Patented Nov. 4, 1919.
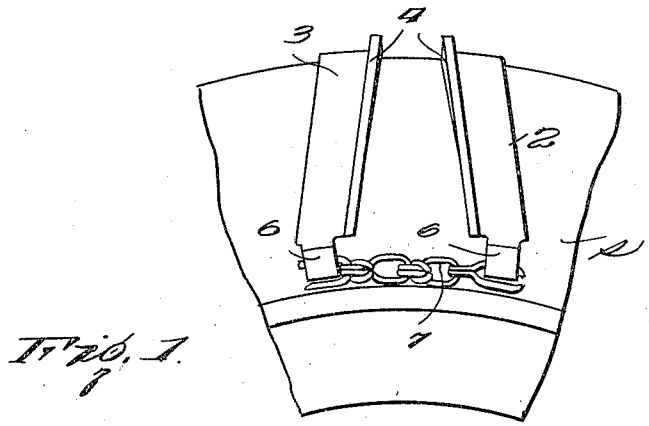
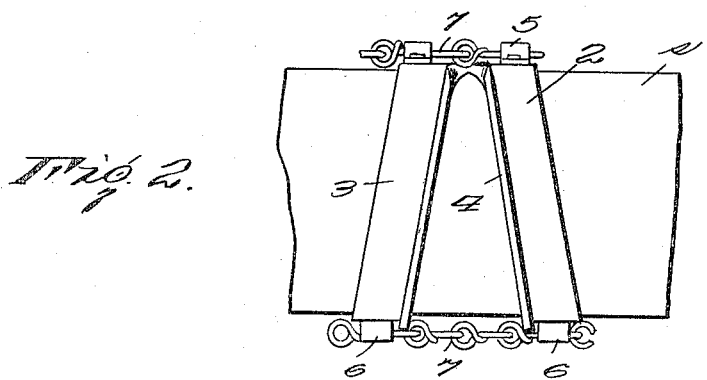
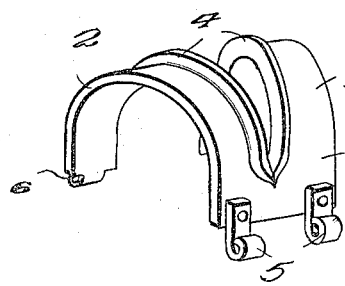
Sigfred E. Haddorff, Inventor
By Geo. P. Kimmel, Attorney

UNITED STATES PATENT OFFICE.

SIGFRED E. HADDORFF, OF IRENE, SOUTH DAKOTA.

NON-SKID ATTACHMENT.

1,321,032. Specification of Letters Patent. Patented Nov. 4, 1919.

Application filed May 13, 1918. Serial No. 234,315.

*To all whom it may concern:*

Be it known that I, SIGFRED E. HADDORFF, a citizen of the United States, residing at Irene, in the county of Turner and State of South Dakota, have invented certain new and useful Improvements in Non-Skid Attachments, of which the following is a specification.

This invention relates to improvements in non-skid attachments for vehicle wheels and it is the principal object of the invention to provide a device which can be easily and quickly attached over the tread portion of a tire or wheel and serve to prevent skidding of the same longitudinally or transversely of a roadway or other surface, thus rendering the device especially desirable for use in traveling over muddy roads by preventing loss of traction due to the skidding or slipping of the wheels of the vehicle.

The improvements in the details and arrangement of parts will be apparent from an inspection of the accompanying drawings, in connection with the specific description hereinafter contained, and wherein the preferred embodiment of the invention is disclosed for the purpose of imparting a full understanding thereof.

In the drawings:

Figure 1 is a side elevation of the improved non-skid device attached to a portion of a pneumatic tire shoe, Fig. 2 is a top plan view thereof, and Fig. 3 is a perspective view of the same.

Having more particular reference to the drawings, in connection with which like reference characters will designate corresponding parts throughout the several views, the improved non-skid device comprises a metal plate 1 curved upon itself to conform to the contour of the ordinary pneumatic tire shoe designated by the reference letter *s;* said plate being split longitudinally and having the opposite sides thereof diverging and indicated by the numerals 2 and 3. To provide an effectual anti-skid means, the adjacent marginal portions of the diverging sides 2 and 3 are flanged as at 4 throughout their length and by reason of their arrangement with relation to the tread portion of the tire shoe *s* will serve to provide means for preventing longitudinal or transverse skidding or slipping of the same.

Hooks 5 are secured to one end of the plate 1 in spaced relation, while other hooks 6 are bent upwardly from the free ends of the diverging side portions 2 and 3 and as will be appreciated serve as means for receiving the links of fastening chains 7, thus facilitating the securing of the non-skid devices in position about the tread portion of the tire shoe *s*. The portion of the chain 7 connected with and extending between the hooks 6 serves to prevent spreading of the spaced terminals of the side portions 2 and 3.

It is of course to be understood that any number of these improved non-skid devices may be arranged about a tire or wheel tread as may be necessary to prevent the skidding of the same. With the devices attached to the tread portions of the driving wheels of a motor driven vehicle, it will be understood that the same will be enabled to travel over muddy or similar roadways without liability of becoming mired therein due to the longitudinal skidding or slipping of the wheel, which as will be appreciated, causes a complete loss of the traction power of the vehicle. Further, transverse skidding of the vehicle will be prevented due to the relative arrangement of the oppositely disposed flanged portion 4 with relation to the tread portion of the tire or wheel.

I claim:

1. A non-skid attachment including a curved plate having a longitudinal slit extending inwardly from one end providing a pair of angularly disposed tread embracing members, and fastening means carried by the plate, a portion of said fastening means forming a connection between the spaced terminals of the side members preventing the latter from spreading and assisting in maintaining the plate in position upon a tire.

2. A non-skid attachment including a curved plate having a longitudinal slit extending inwardly from one end providing a pair of tread embracing members diverging from their joined to their opposite ends, the spaced terminals of the tread embracing members being formed to engage a fastening element whereby the attachment is secured in position upon a tire and said tread embracing members are prevented from spreading.

In testimony whereof I affix my signature hereto.

SIGFRED E. HADDORFF.

Copies of this patent may be obtained for five cents each, by addressing the "Commissioner of Patents, Washington, D. C."